United States Patent
Xiong et al.

(10) Patent No.: US 8,725,110 B2
(45) Date of Patent: May 13, 2014

(54) MOBILE COMMUNICATION TERMINAL AND METHOD FOR MANAGING SIM CARDS

(75) Inventors: Yu-Kai Xiong, Shenzhen (CN); Xin Lu, Shenzhen (CN); Shih-Fang Wong, New Taipei (TW); Dong-Sheng Lv, Shenzhen (CN); Yu-Yong Zhang, Shenzhen (CN); Jian-Jian Zhu, Shenzhen (CN); Xin-Hua Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/448,448

(22) Filed: Apr. 17, 2012

(65) Prior Publication Data
US 2013/0130646 A1    May 23, 2013

(30) Foreign Application Priority Data
Nov. 18, 2011  (CN) .......................... 2011 1 0367864

(51) Int. Cl.
*H04M 11/00*  (2006.01)

(52) U.S. Cl.
USPC .......................................... 455/407; 455/406

(58) Field of Classification Search
USPC .................................................. 455/406, 407
See application file for complete search history.

(56) References Cited

U.S. PATENT DOCUMENTS

| | | | |
|---|---|---|---|
| 2009/0264122 A1* | 10/2009 | Van Loon et al. | 455/433 |
| 2010/0048191 A1* | 2/2010 | Bender et al. | 455/416 |
| 2010/0279688 A1* | 11/2010 | Seif et al. | 455/435.2 |
| 2011/0117964 A1* | 5/2011 | Luo | 455/558 |

* cited by examiner

*Primary Examiner* — Charles Appiah
*Assistant Examiner* — Edward Zhang
(74) *Attorney, Agent, or Firm* — Novak Druce Connolly Bove + Quigg LLP

(57) ABSTRACT

A mobile communication terminal includes a first SIM card, a second SIM card, a surfing detecting module, a bandwidth detecting module, and a control module. The first SIM card uses a first payment mode to pay for surfing the Internet according to bandwidth used. The second SIM card uses a second payment mode to pay for surfing the Internet according to time used. The surfing detecting module detects whether the mobile communication terminal is connected to the Internet. The bandwidth detecting module detects the bandwidth used. The control module enables one of the first and the second SIM cards according to the bandwidth used.

7 Claims, 2 Drawing Sheets

MOBILE COMMUNICATION TERMINAL AND METHOD FOR MANAGING SIM CARDS

BACKGROUND

1. Technical Field

The present disclosure relates to mobile communication terminals, and particularly to a communication terminal with dual subscriber identification modules (SIM) cards and a SIM card managing method.

2. Description of Related Art

More and more mobile phones or other mobile communication terminals are configured with dual SIM cards. The mobile communication terminals may be capable of surfing the Internet. The cost for surfing the Internet includes two plans or modes. One mode is to pay for surfing the Internet according to bandwidth, which fits the users who download limited data and use less bandwidth. The other mode is to pay for surfing according to time used, which fits the users who download a lot of data and use a lot of bandwidth. However, some users sometimes question their bill because they are confused as to which mode costs less.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
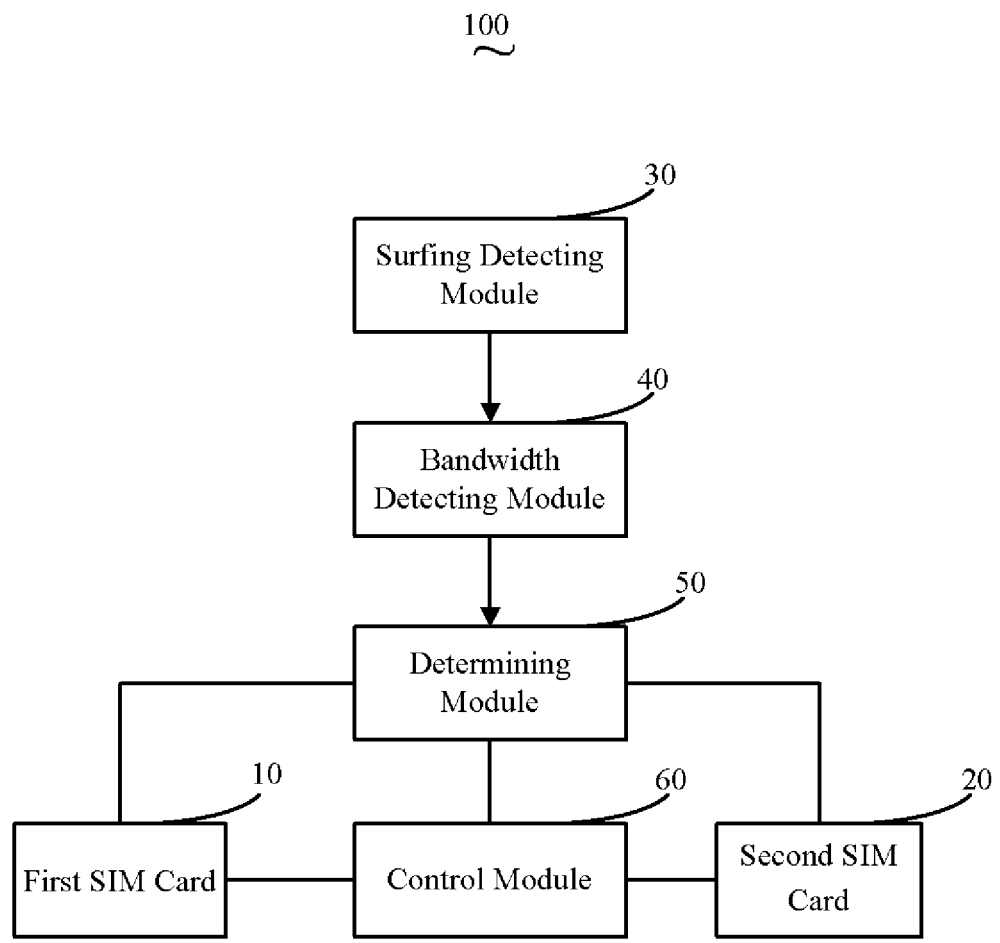
FIG. 1 is a block diagram of the functioning modules of a mobile communication terminal.

FIG. 1 shows a mobile communication terminal 100 capable of sending and receiving phone calls, sending/receiving message, surfing the Internet, for example. The mobile communication terminal 100 may be a mobile phone, a personal digital assistant (PDA), or a palm computer. The cost for surfing the Internet includes a first payment mode and a second payment mode. The first payment mode is to pay for surfing the Internet according to bandwidth, which fits the users who download limited data and use less bandwidth. The second payment mode is to pay for surfing according to time used, which fits the users who download a lot of data and use a lot of bandwidth.

The mobile communication terminal 100 includes a first SIM card 10, a second SIM card 20, a surfing detecting module 30, a bandwidth detecting module 40, a determining module 50, and a control module 60. In this embodiment, the first SIM card 10 uses the first payment mode. The second SIM card 20 uses the second payment mode. The mobile communication terminal 100 is powered up, one of the first SIM card 10 and the second SIM card 20 is used. In this embodiment, the first SIM card 10 is defined as a default card. In other words, the first SIM card 10 is enabled with the second SIM card 20 being disabled when the mobile communication terminal 100 is powered up.

The surfing detecting module 30 determines whether the mobile communication terminal 100 is connected to the internet, and transfers a detecting signal to the bandwidth detecting module 40 when the mobile communication terminal 100 is connected to the internet.

The bandwidth detecting module 40 detects the bandwidth used by the users, and transfers the number of bytes used to the determining module 50, in response to the detecting signal.

The determining module 50 determines whether the bandwidth exceeds a predetermined amount, and transfers a control signal to the control module 60 to control the first SIM card 10 or the second SIM card 20 to be enabled according to a determined result. For example, the control module 60 controls the first SIM card 10 to be enabled, and the second SIM card 20 to be disabled when the bandwidth does not exceed a predetermined amount. While the control module 60 controls the second SIM card 20 to be enabled, and the first SIM card 10 to be disabled when bandwidth used exceeds a predetermined amount.

Figure 2:
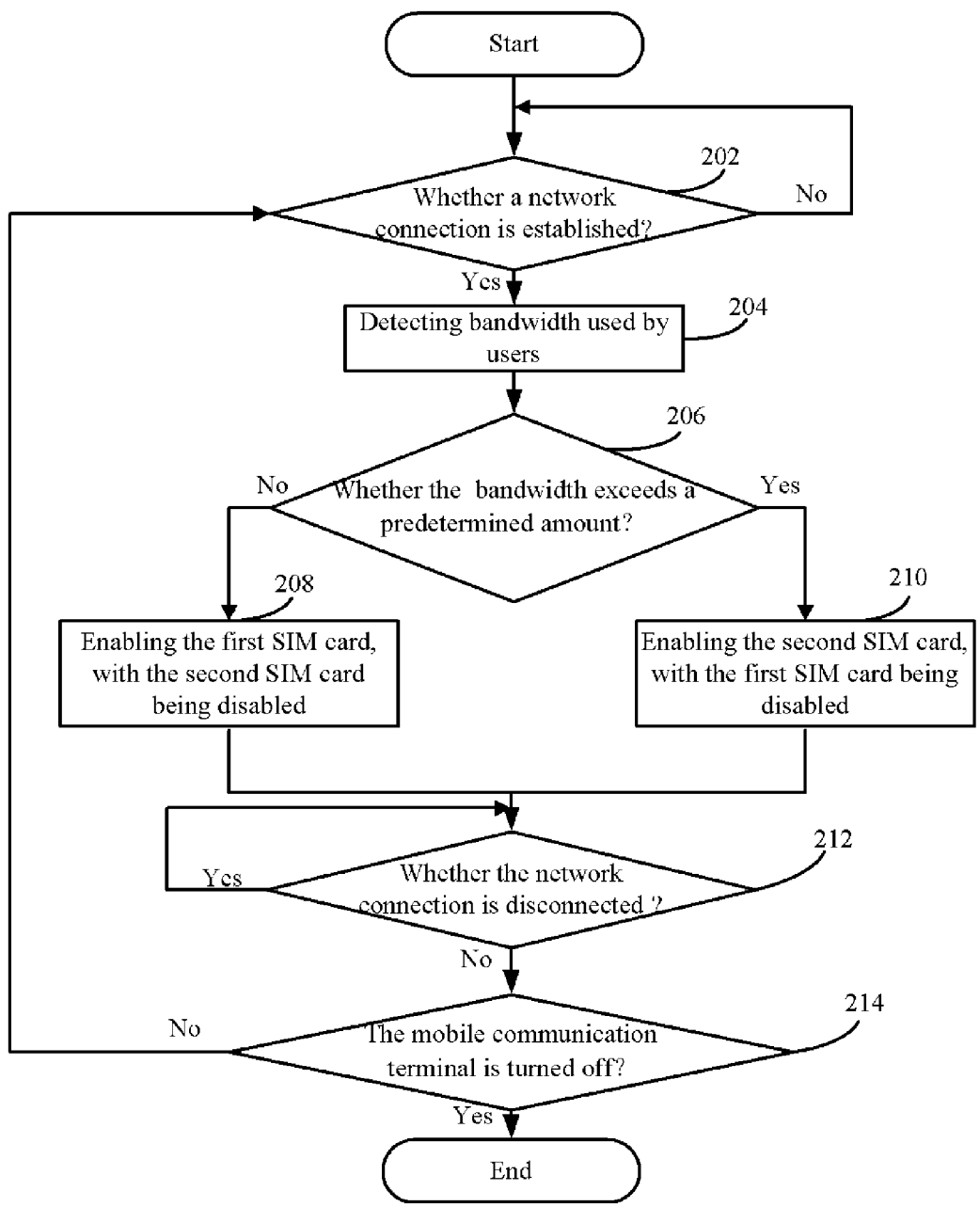
FIG. 2 is a flow chart of a SIM card managing method.

FIG. 2 shows a card managing method for managing the SIM cards of a mobile communication terminal. The mobile communication terminal includes a first SIM card and a second SIM card. The first SIM card uses a first payment mode to pay for surfing the Internet according to bandwidth used, which fits the users who download limited data and use less bandwidth. The second SIM card uses a second payment mode to pay for surfing the Internet according to time used, which fits the users who download a lot of data and use a lot of bandwidth. The card managing method includes following steps:

In step 202, detecting whether a network connection is established.

In step 204, detecting the bandwidth used by users, if the network connection is established.

In step 206, determining whether the bandwidth exceeds a predetermined amount.

In step 208, enabling the first SIM card 10, with the second SIM card 20 being disabled, if the bandwidth does not exceed a predetermined amount.

In step 210, enabling the second SIM card 20, with the first SIM card 10 being disabled, if the bandwidth exceeds a predetermined amount.

In step 212, determining whether the network is disconnected, repeating the step 212 if the network connection is disconnected, and going to step 214 if the network connection is not disconnected.

In step 214, whether the mobile communication terminal is turned off, and the processer has stopped if the mobile communication terminal is turned off.

It is to be understood, however, that even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A mobile communication terminal comprising:
a first subscriber identification module (SIM) card using a first payment mode to pay for surfing the Internet according to bandwidth used;
a second SIM card using a second payment mode to pay for surfing the Internet according to time used;
a surfing detecting module to detect whether the mobile communication terminal is connected to the Internet;

a bandwidth detecting module to detect the bandwidth used; and a control module to enable one of the first and the second SIM cards to save payment for surfing the Internet according to the bandwidth used;

and a detecting module to detect whether the bandwidth exceeds a predetermined amount, the control module to enable the first SIM card to be used when the bandwidth does not exceed the predetermined amount, and enable the second SIM card to be used when the bandwidth exceeds the predetermined amount.

2. The mobile communication terminal of claim 1, wherein one of the first SIM card and the second SIM card is enabled when the mobile communication terminal is powered up.

3. A card managing method applied to a mobile communication terminal, the mobile communication terminal comprising a first subscriber identification module (SIM) card and a second SIM card, the first SIM card using a first payment mode to pay for surfing the Internet according to bandwidth used, the second SIM card using a second payment mode to pay for surfing the Internet according to time used, the card managing method comprising the steps of: determining whether a network connection is established; detecting bandwidth if the network connection is established;

determining whether the detected bandwidth exceeds a predetermined amount;

enabling the first SIM card if the detected bandwidth does not exceed the predetermined amount; and enabling the second SIM card if the detected bandwidth exceeds the predetermined amount.

4. The card managing method of claim 3, further comprising:

enabling one of the first SIM card and the second SIM card if the mobile communication terminal is powered up.

5. The card managing method of claim 4, further comprising:

enabling the first SIM card if the mobile communication terminal is powered up.

6. A mobile communication terminal comprising:

a first subscriber identification module (SIM) card using a first payment mode to pay for surfing the Internet according to bandwidth used;

a second SIM card using a second payment mode to pay for surfing the Internet according to time used;

a surfing detecting module to detect whether the mobile communication terminal is connected to the Internet;

a bandwidth detecting module to detect the bandwidth used; and a control module to enable the first SIM card to be used when the bandwidth does not exceed a predetermined amount, and enable the second SIM card to be used when the bandwidth exceeds the predetermined amount.

7. The mobile communication terminal of claim 6, wherein one of the first SIM card and the second SIM card is enabled when the mobile communication terminal is powered up.

* * * * *